May 6, 1924.

J. R. BLAINE

SHAFT CLAMP

Filed April 27, 1917

1,493,063

Witnesses

Inventor
Joseph R Blaine
By Wilkinson & Huxley
Attys

Patented May 6, 1924.

1,493,063

UNITED STATES PATENT OFFICE.

JOSEPH R. BLAINE, OF OAK PARK, ILLINOIS, ASSIGNOR TO MIEHLE PRINTING PRESS AND MANUFACTURING COMPANY, OF CHICAGO, ILLINOIS, A CORPORATION OF ILLINOIS.

SHAFT CLAMP.

Application filed April 27, 1917. Serial No. 164,941.

*To all whom it may concern:*

Be it known that I, JOSEPH R. BLAINE, a citizen of the United States, and resident of Oak Park, in the county of Cook and State of Illinois, have invented certain new and useful Improvements in a Shaft Clamp, of which the following is a specification.

My invention relates to a novel expanding clamp for use in securing a gear, pulley, crank or other power transmitting element to a shaft.

An object of the invention is to provide means for removably securing an element, such as described, to a shaft in such manner that the hub or sleeve which is to be secured on the shaft shall have a full bearing thereon throughout its length, the expansive clamping force being exerted in right lines with relation to the axis of the shaft.

The shaft to which the power transmitting element is secured is preferably divided in a plane at an angle other than 90° to the longitudinal axis of the shaft; the hub of the attaching element surrounds the shaft at the point of division, and a bolt is employed to force the two shaft sections endwise. This causes a radially acting expansive force to be exerted, which serves to clamp the hub upon the shaft.

Figure 1:
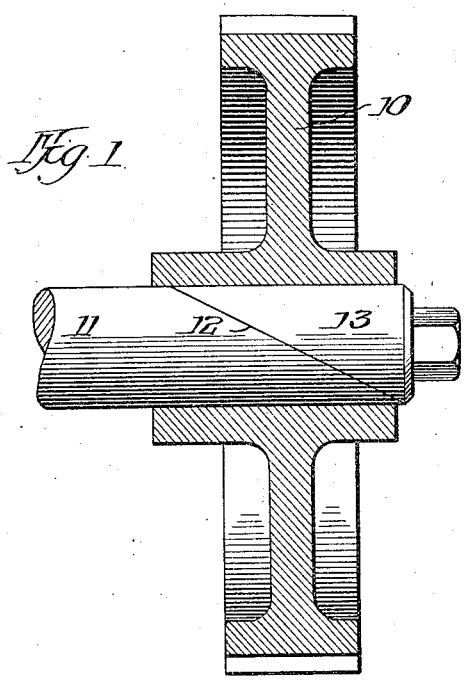
Figure 2:
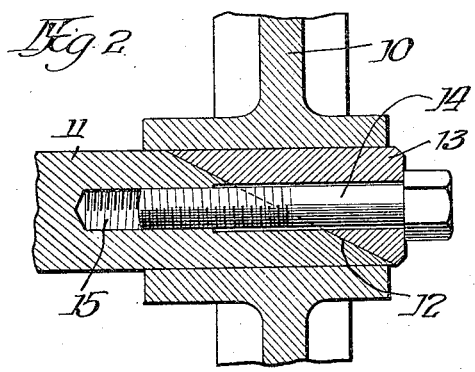
Figure 3:
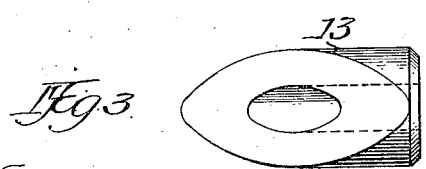

The invention will be more readily understood by reference to the accompanying drawings, wherein, Fig. 1 is a sectional view through a gear mounted on a shaft, my improved means being employed for clamping the same in place;

Fig. 2 is a fragmentary sectional view showing the clamping device in detail, and, Fig. 3 is a side view of the severed end of the shaft.

In the drawings a gear 10 is shown as mounted on a shaft 11, the end of the shaft being severed or divided along a line 12 extending diagonally and of an angularity relative to the shaft axis, such as to exert a powerful, radially acting force when the sections are moved relatively endwise.

It will be noted that the hub has a complete bearing throughout its length on the main section 11 of the shaft, and a similar bearing on the short section 13. So great an area adapted to develop frictional resistance assures the locking of the parts with a relatively small force exerted endwise of the sections. As a means of exerting this force, I provide the cap bolt 14, which passes through a slightly enlarged axial opening in the section 13 and engages a threaded opening 15 in the main shaft section.

The enlargement of the opening for the bolt 14 permits of a slight bodily transverse movement of the section 13 as required.

My invention is distinguished from a construction in which an expanding wedge is inserted in the split end of a shaft. In that instance the expansive force is not exerted in a true radial line and a full bearing cannot be had on the shaft.

While I have shown a gear mounted on the end of a shaft, it will be understood that there is no limitation of the invention thereby. Any form of power transmitting element is adapted to be secured at any point near the end of a shaft. Neither is the form of the axial force-exerting means important and modifications may be made in all of the elements without departure from the spirit of my invention.

I claim:

1. In combination, a shaft divided diagonally into two separate parts with the inclined portions in mutual slidable contact, a power transmitting member embracing the shaft around the joint thereof and having a bearing on each of said parts throughout substantially the entire width of the embracing part of said power transmitting member, said shaft members having longitudinal communicating bores, and means for drawing together the shaft portions and thereby wedging them against the power transmitting member, said means including a bolt having a head rigid therewith, said bolt being screw-threaded into one of said shaft portions, the head of said bolt being positioned to exert pressure against the other of said shaft portions.

2. In combination, a shaft divided diagonally into two separate parts with the inclined portions in mutual slidable contact, said parts having longitudinal communicating bores, one of the bores being screw threaded and of less diameter than the other bore, a power transmitting element embracing the shaft around the joint thereof and having a bearing on each of said parts throughout substantially the entire width of the embracing part of said power transmitting element, and means for drawing together the shaft portions and thereby wedging them against the power transmitting member, said means including a bolt having a head rigid therewith, said bolt being threaded into one of said shaft portions, the head of said bolt being positioned to exert pressure against the other of said shaft portions and being accessible for adjustment at the outer end of the other shaft portion.

Signed at Chicago, Illinois, this 24th day of April, 1917.

JOSEPH R. BLAINE.

Witnesses:
CHAS. F. MURRAY,
MILTON T. MILLER.